United States Patent [19]
Humlicek et al.

[11] Patent Number: 5,822,782
[45] Date of Patent: Oct. 13, 1998

[54] METHODS AND STRUCTURE TO MAINTAIN RAID CONFIGURATION INFORMATION ON DISKS OF THE ARRAY

[75] Inventors: Donald R. Humlicek, Wichita; John R. Kloeppner, Hesston; Grover G. Phillips, Andover; Curtis W. Rink, Wichita, all of Kans.

[73] Assignee: Symbios, Inc., Fort Collins, Colo.

[21] Appl. No.: 549,383

[22] Filed: Oct. 27, 1995

[51] Int. Cl.$^6$ ............................. G06F 12/00; G06F 13/10
[52] U.S. Cl. .................................... 711/170; 711/114
[58] Field of Search ..................... 395/441, 497.01, 395/497.02, 497.03, 182.05; 364/DIG. 1

[56] References Cited

U.S. PATENT DOCUMENTS

| | | | |
|---|---|---|---|
| 5,173,818 | 12/1992 | Ogihara . | |
| 5,179,704 | 1/1993 | Jibbe et al. | 395/735 |
| 5,257,391 | 10/1993 | DuLac et al. | 395/800 |
| 5,394,532 | 2/1995 | Belsan . | |
| 5,440,716 | 8/1995 | Schultz et al. | 711/114 |
| 5,440,737 | 8/1995 | Uchinuma | 395/600 |
| 5,479,653 | 12/1995 | Jones | 395/182.03 |
| 5,491,810 | 2/1996 | Allen | 711/117 |
| 5,502,836 | 3/1996 | Hale et al. | 711/170 |
| 5,519,844 | 5/1996 | Stallmo | 711/114 |
| 5,530,658 | 6/1996 | Hafner et al. | 364/578 |
| 5,613,085 | 3/1997 | Lee et al. | 711/114 |

*Primary Examiner*—Tod R. Swann
*Assistant Examiner*—J. Peikari
*Attorney, Agent, or Firm*—Daniel N. Fishman; Wayne P. Bailey

[57] ABSTRACT

Methods and associated apparatus operable in a RAID subsystem to improve the speed and flexibility of initializing the subsystem by storing configuration and identification information in a reserved area on each disk drive in the subsystem. The reserved area on each disk drive of the disk array contains a unique identifier to identify the particular disk drive from all others and further contains group configuration information regarding all groups in which the particular disk drive is a member. The configuration and identification information is generated and written to each disk drive in the disk array when the particular disk drive is configured so as to be added or deleted from groups of the subsystem. Upon subsystem reset (e.g. power on reset or other reset operations), the RAID controller in the subsystem determines the proper configuration of the RAID groups despite temporary unavailability or physical relocation of one or more disk drives in the disk array. In addition, entire groups of disk drives may be moved from one subsystem to another and automatically recognized by the new controller when the controller is reset.

18 Claims, 6 Drawing Sheets

METHODS AND STRUCTURE TO MAINTAIN RAID CONFIGURATION INFORMATION ON DISKS OF THE ARRAY

BACKGROUND OF THE INVENTION

1. Field of the Invention

The invention relates generally to the control methods operable within a disk array subsystem (RAID) and in particular to a method for maintaining array configuration information on each drive of the disk array.

2. Background of the Invention

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID levels 2, 3, 4 and 5 systems, segment the data into portions for storage across several data disks. One or more additional disks are utilized to store error check or parity information. The methods of the present invention may be useful in conjunction with any of the standard RAID levels including level 0.

RAID storage subsystems typically utilize a control module that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

Each of these configurations (geometries or RAID levels) may be preferred over the others in particular applications depending upon performance or reliability requirements. It is vital to proper operation of the RAID storage subsystem that the configuration information be maintained. Each disk drive of the disk array must be in a known address and/or physical position with respect to the various interface and control busses. The order of the various disk drives in their respective groupings is critical to proper operation of the RAID subsystem. Furthermore, many RAID storage subsystems permit a plurality of groupings of disk drives to be simultaneously operable within the subsystem. Each grouping may be operating under a different RAID geometry to satisfy the needs of a particular application. Current RAID controllers therefore store this configuration information for rapid recall and processing. The current RAID controllers typically store this information on the RAID controller in such a manner that a particular group of disk drives, identified by their physical interface connections to the controller, is configured for a particular level of RAID operation. Disk drives are identified only by their physical interconnection to the controller and are otherwise treated as identical to one another.

Due to this method of storing the configuration information, the mere physical interconnection movement of a single disk drive in a group may result in degraded performance of the RAID subsystem until the drive is restored to its configured position and the affected groups are rebuilt. A disk drive may be so moved due to any of several common operations including temporary removal of a disk drive for adjustment, "hot swap" of a drive with a spare drive, or simply a temporary non-operative mode of the disk drive. While the disk is not in its configured physical interconnect position it is essentially lost with respect to operation of the disk array (or at least with respect to the group(s) in which it is a member. Under such disk loss conditions, current RAID controllers must degrade the performance of the RAID subsystem (potentially halting further operation depending upon the RAID configuration) until the lost drive is replaced to its original physical interconnect location and the affected groups are rebuilt. When the drive is replaced, current RAID controllers cannot detect whether the disk drive is the same drive that was removed, or another disk drive. Therefore, current RAID controllers must rebuild the data on the newly inserted disk drive to assure proper operation of the disk array.

In view of the above it is clear that a need exists for an improved drive identification architecture and control method for RAID subsystems which permits improved flexibility in the reconfiguration (physical interconnect movement) of disk drives in the disk array of a RAID subsystem.

SUMMARY OF THE INVENTION

The present invention solves the above and other problems, and thereby advances the useful arts, by providing methods and associated apparatus for recording configuration information pertaining to the RAID subsystem on each disk drive of the RAID subsystem. The methods of the present invention further utilize the stored configuration information to permit more flexibility in the reconfiguration of the disk drives in the RAID subsystem. The RAID controller interrogates the configuration stored on all drives physically connected to the RAID subsystem to determine the proper grouping of disk drives in the disk array regardless of the physical interconnection location of the disk drives in the RAID subsystem.

In particular, the present invention includes a configuration data structure stored in a reserved area of each disk drive of the disk array. The data structure includes a unique identification field to uniquely identify each disk drive. The unique ID is formed by using subfields which record the location of the disk drive (in a particular physical position in a particular RAID subsystem) and append a timestamp to indicate the validity of the location information as well as to help maintain the uniqueness of the ID field. In addition, the data structure stored on each disk drive of the disk array includes group configuration information including fields indicating the configuration of disk groupings within the RAID subsystem in which the disk drive is a member. The group configuration information records the relevant information to describe the characteristics and geometry of the group with which the disk drive was most recently associated. Included in the group configuration information is the unique identifier information for each other disk drive in the group to thereby describe the disk drives relationship to other disk drives in the same group.

Methods of the present invention read and utilize the stored configuration information when initializing the RAID subsystem to determine whether disk drives have been moved with respect to their physical interconnection with the RAID subsystem. So utilizing this configuration information permits improved flexibility in the use of the RAID subsystem by allowing drives to be physically moved within the subsystem without requiring a rebuild of the stored data. The configuration information is instead utilized to identify the location (or new location) of each disk drive in each group of the RAID subsystem. In addition, the RAID controller may note that an entire group of disk drives, possibly moved from another RAID subsystem, have been added to its disk array. The newly added group has all the configuration information required to permit the RAID controller to assume control of the newly added disk array grouping.

This added flexibility in RAID subsystem control may be used by an operator to help level the load of I/O requests across RAID subsystems or even across interconnect busses within a particular RAID subsystem.

It is therefore an object of the present invention to provide methods and associated apparatus for improving the flexibility of RAID subsystems to recognize the desired configuration of the disk array in the RAID subsystem.

It is a further object of the present invention to provide methods and associated apparatus for storing RAID subsystem configuration information in reserved areas of each disk drive in the disk array.

It is still a further object of the present invention to provide methods and associated apparatus for utilizing configuration stored on each disk drive of a RAID subsystem to improve the flexibility of initializing the RAID subsystem.

It is yet another object of the present invention to provide methods and associated apparatus for utilizing configuration stored on each disk drive of a RAID subsystem reduce the time required to initialize the RAID subsystem.

The above and other objects, aspects, features, and advantages of the present invention will become apparent from the following description and the attached drawing.

DETAILED DESCRIPTION OF THE PREFERRED EMBODIMENT

Figure 1:
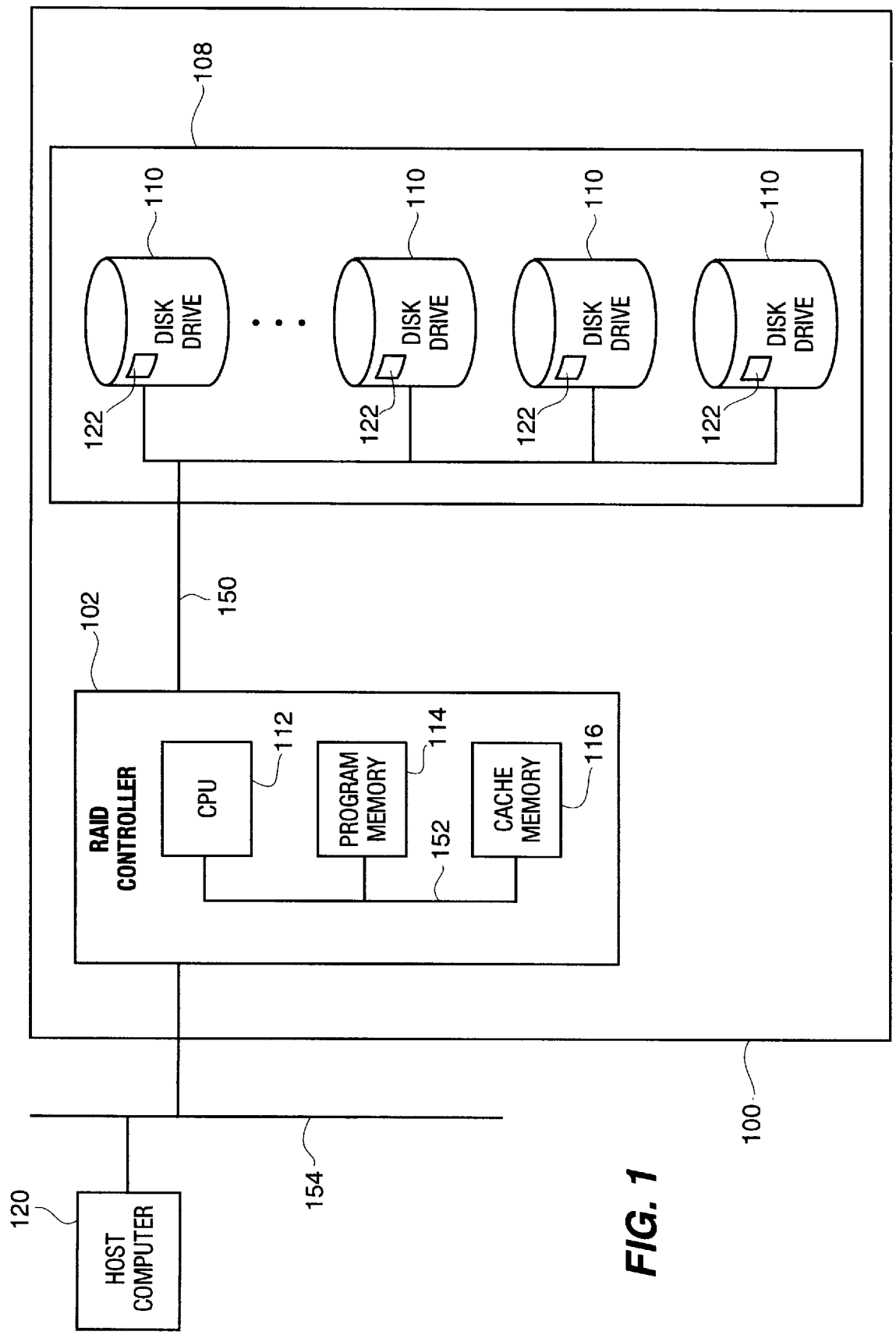
FIG. 1 is a block diagram of a typical RAID storage subsystem in which the structures and methods of the present invention may be applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

RAID OVERVIEW

FIG. 1 is a block diagram of a typical RAID storage subsystem 100 in which the methods and associated apparatus of the present invention may be applied. RAID storage subsystem 100 includes RAID controller 102 which is in turn connected to disk array 108 via bus (or busses) 150 and to host computer 120 via bus 154. Disk array 108 is comprised of a plurality of disk drives 110. One of ordinary skill in the art will readily recognize that interface bus 150 between RAID controller 102 and disk array 108 (including disk drives 110) may be any of several industry standard interface busses including SCSI, IDE, EIDE, IPI, Fiber Channel, SSA, PCI, etc. Circuits (not shown) within RAID controller 102 appropriate to controlling bus 150 are well known to those of ordinary skill in the art. Interface bus 154 between RAID controller 102 and host computer 120 may be any of several standard industry interface busses including SCSI, Ethernet (LAN), Token Ring (LAN), etc. Circuits (not shown) within RAID controller 102 appropriate to controlling bus 154 are well known to those of ordinary skill in the art.

As shown in FIG. 1, RAID storage subsystem 100 may be applied to implement any of the well known RAID levels (e.g. levels 0–5). The various RAID levels are distinguished by the manner in which RAID controller 102 logically subdivides or partitions the disk drives 110 in disk array 108. For example, when implementing RAID level 1 features, approximately half of the disk drives 110 of disk array 108 are used to store and retrieve data while the other half is operated by RAID controller 102 to mirror the data storage contents of the first half. Further, when implementing RAID level 4 features, RAID controller 102 utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels. However, the present invention is mostly readily applicable to operation of a RAID storage subsystem 100 implementing the features of RAID levels 0–5.

RAID controller 102 includes CPU 112, program memory 114 (e.g. ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices. One of ordinary skill in the art will readily recognize that the block diagram of FIG. 1 is intended only as an exemplary design which may embody the present invention. Many alternate controller and subsystem designs may embody the methods and associated apparatus and structures of the present invention.

DISK CONFIGURATION INFORMATION

The present invention includes a data structure stored in a reserved area 122 on each disk drive 110 of the disk array 108. The data structure in the reserved area 122 contains information which uniquely identifies each disk drive from all other disk drives. The data structure stored in the reserved area 122 of each disk drive 110 also includes configuration information which describes each group of the disk array 108 in which the corresponding disk is a member. This group configuration information includes characteristics of the group, timestamps to identify the date/time of creation of the configured group, as well as a list of disk drive unique identification information for each disk drive 110 which is a member of the group. Methods, discussed in additional detail below, are used to store this data structure on each disk drive and to utilize the configuration and identification information to provide additional flexibility and speed in the initialization of the RAID subsystem.

Figure 2:
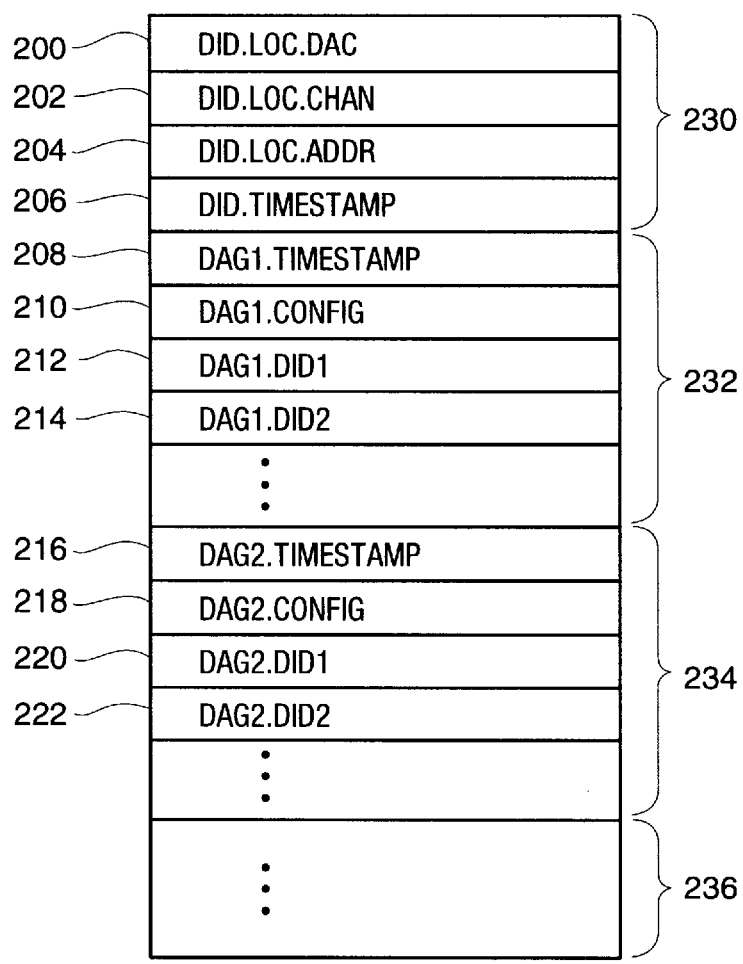
FIG. 2 depicts a data structure stored in the reserved area of each disk drive describing the configuration information relevant to the disk drive.

FIG. 2 is a graphical view of the data structure stored on each disk drive 110 in the disk's reserved area 122. A unique identification element 230 is generated and stored on each disk drive 110. The unique identification element 230 (also referred to herein as DID 230) is composed of a number of subfields as depicted in FIG. 2. Specifically, the DID includes location subfields that identify the physical association of the disk drive with a particular location in a particular RAID subsystem and a timestamp subfield. The location subfields include DID.LOC.DAC 200 which identifies the disk array controller (the RAID subsystem) with which the disk drive was associated when it was first added to a group of that subsystem. The DID.LOC.CHAN 202 location subfield identifies the channel (interface bus 150 for example) on which the disk drive was positioned when it was first added to a group of the subsystem. The DID-.LOC.ADDR 204 location subfield identifies the address on the identified channel at which the disk drive was connected when first initialized in a group of the RAID subsystem. The DID.TIMESTAMP 206 field provides a further element to assure the uniqueness of the DID 230. One of ordinary skill in the art will readily recognize that the DID 230 element may be constructed by any of several well known techniques to assure its uniqueness. The specific location and timestamp subfields depicted in FIG. 2 and discussed above are intended only as exemplary of one possible design. This design is preferred only in that some information content is available in the location subfields which may be utilized for its semantic meaning by other applications of the RAID subsystem. Any structure of the DID 230 may be used so long as it is assured to generate a unique ID for each disk drive.

The data structure stored in the reserved area 122 of each disk drive 110 further comprises zero or more group configuration information sections 232, 234, 236, etc. Each group configuration information section describes configuration information of a disk array grouping in which the corresponding disk drive is a member. Each disk array group information section 232, 234, 236, etc. (also referred to herein as DAG1 232 and DAG2 234) are comprised of a number of subfields. The DAG1.TIMESTAMP 208 and DAG1.CONFIG 210 subfields provide global information regarding the configuration of the subject group in which the corresponding disk drive 110 is a member. The TIMESTAMP 208 subfield contains the date/time of creation of the group while the CONFIG 210 subfield contains other parameters of the group configuration (such as RAID level, number of disk drives, location of the error checking information in the group, etc.).

Each DAG (DAG1 232, DAG2 234, etc.) includes a list of the unique identifier (DID) of each disk drive 110 which is a member of the corresponding group. DID 230 of the current disk drive 110 as well as the corresponding DID of all other disk drives in the same group will be listed in each DAG 232, 234, etc. DAG1.DID1 212 contains the DID 230 of one drive in the configured group, DAG1.DID2 214 contains a second DID 230 for another disk drive in the group, etc. One of ordinary skill in the art will readily recognize that storage space in the reserved area may be conserved by removing the redundant storage of DID 230 (the current drive) from the list of drives participating in each group. The membership of the current drive (DID 230) is implied by virtue of the group configuration information section (DAG 232, 234, etc.) being stored on the disk drive.

DAG2 234 is a second exemplary group shown in FIG. 2 representing a second group in which the current disk drive 110 is a member. Each disk drive 110 may be a member in zero or more configured groups. A DAG section (i.e. DAG1 232 and DAG2 234) is stored in the reserved area 122 of each disk for each group in which the corresponding disk is a member. A disk drive 110 which participates in no configured group has no group configuration information sections stored in its reserved area 122.

One of ordinary skill in the art will readily recognize that the data structure of FIG. 2 is intended as exemplary of a data structure which contains the disk drive identification information and the group configuration information of each disk drive. Many equivalent structures and modifications may be suggested to one of ordinary skill in the art which are within the claimed scope of the present invention.

WRITING CONFIGURATION INFORMATION

Figure 3:
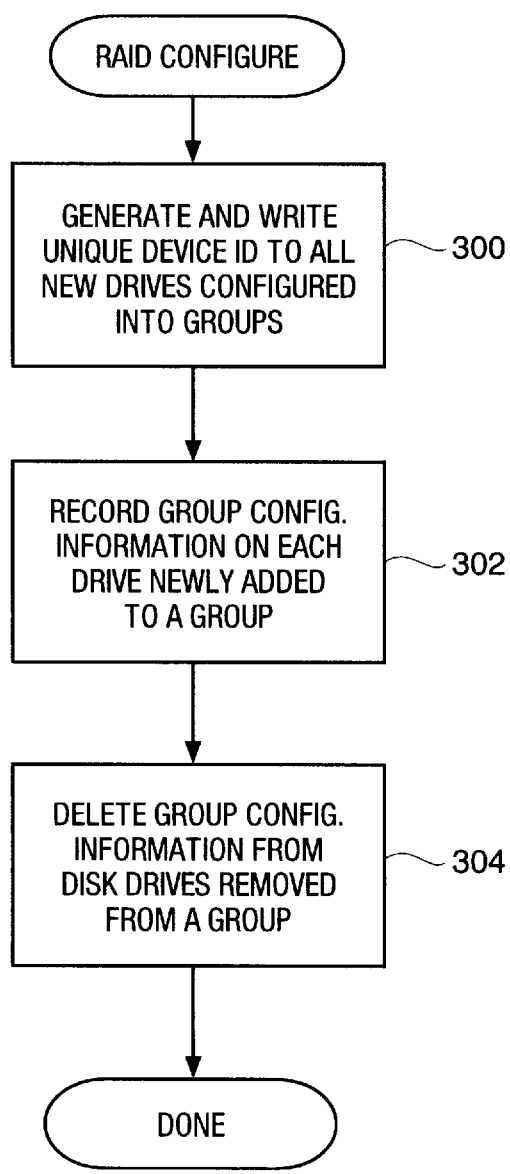
FIG. 3 is a flowchart describing portions of a typical RAID configuration operation modified in accordance with the methods of the present invention.

FIG. 3 is a flowchart describing the steps pertaining to the present invention for performing a configure operation on the RAID subsystem. A RAID configure operation is well known to those of ordinary skill in the arts to assign disk drives within the RAID subsystem to groups. In addition, the RAID configure operation determines the storage characteristics and methods for each group so defined. The flowchart of FIG. 3 depicts those portions of a RAID configuration operation which are relevant to the present invention wherein configuration information and identification information is stored on the disk drives of the disk RAID.

Element 300 is first operable to generate and write unique device identification information to all new drives configured into groups of the RAID subsystem. The first time a drive is successfully configured into a group, the drive identification information, DID 230 of FIG. 2, is generated and written to the reserved area 122 of each disk drive. As described above with respect to FIG. 2, DID 230 comprises a number of subfields used to assure uniqueness of the drive identification. Element 302 is next operable to record group configuration information on each disk drive which is newly added to a specific group configured in the RAID subsystem. As noted above, group configuration information, DAG1 232, DAG2 234, etc. of FIG. 2, describe the configuration and options associated with a group definition. In particular, the group configuration information includes the drive identification information from each disk drive configured into the specific newly configured group. Element 302 performs the processing associated with the configuration operation to add group configuration information to a newly added disk drive in a group, whether the group was previously defined or newly defined. Finally, element 304 is operable to delete group configuration information, e.g. DAG 232, 234, etc. of FIG. 2, from disk drives newly removed from a group configuration. As noted above, the RAID configure operation may define new groups within the RAID subsystem, delete previously defined groups within the RAID subsystem, or alter the configuration information relating to a previously defined groups. Element 304 then is operable to delete the group configuration information, for example, DAG1 232, or DAG2 234, etc. of FIG. 2, from any disk drive removed from a particular previously configured group.

UTILIZING CONFIGURATION INFORMATION

Figure 4:
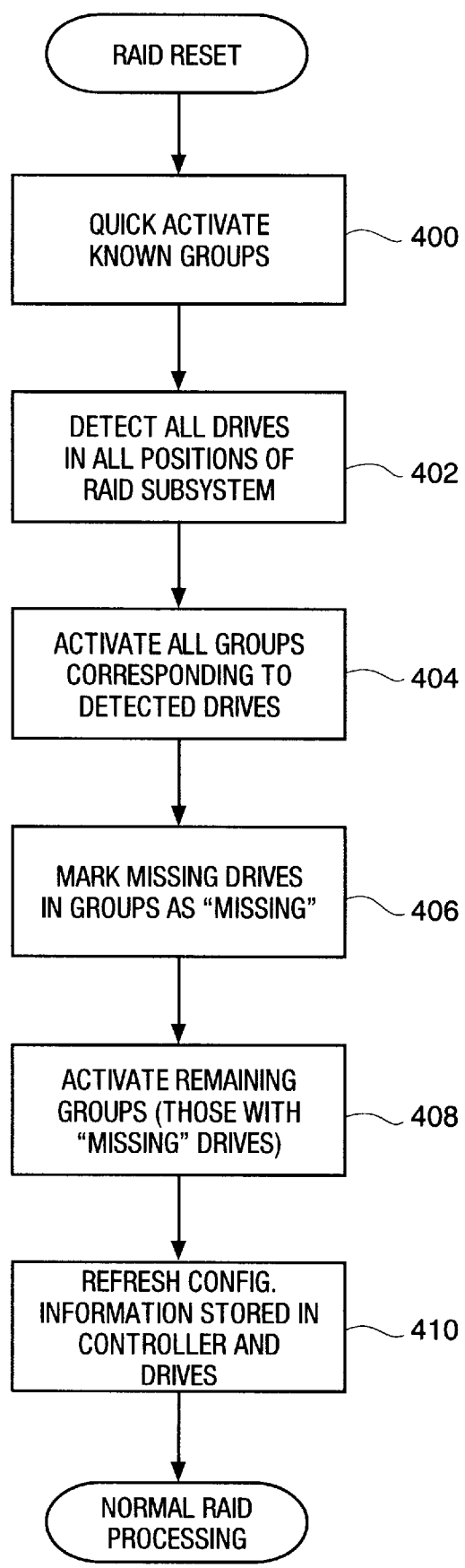
FIG. 4 is a flowchart describing portions of a typical RAID reset operation modified in accordance with the methods of the present invention.

FIG. 4 is a flowchart depicting methods of the present invention utilized when the RAID subsystem is reset. A reset may be initiated due to a power on condition of the RAID subsystem, such as at the start of a day, or may be initiated in response to a host computer request directed to the RAID subsystem. As part of such a reset operation, methods of the present invention must verify the configuration of the RAID subsystem to account for any changes in the configuration as described by the configuration operation discussed above with respect to FIG. 3 or in response to physical alterations to the configuration by human intervention or component failures. As noted above, methods of the present invention store configuration information describing the groups within the RAID subsystem and the individual disk drives within each group on each disk drive of the RAID subsystem. The method depicted in FIG. 4 utilizes the stored configuration and identification information to identify and activate groups of the disk array in the RAID subsystem. By storing the information on disk drives of the disk array, the present invention may more flexibly identify disk drives associated with a group regardless of operator intervention physically moving the disk drives within the RAID subsystem or between RAID subsystems.

Element 400 of FIG. 4 is first operable to quickly identify and activate all groups defined within the RAID subsystem which correspond to disk drives found in physical positions of the RAID subsystem previously known to have contained a disk drive. Element 400 is intended to rapidly activate the disk array groups most recently known to be present in the RAID subsystem. This allows the RAID subsystem to begin processing host computer requests as rapidly as possible following the reset operation because under normal conditions, no reconfiguration of the RAID subsystem need be discovered. Details regarding identification for activation of disk array groups is discussed below with respect to FIG. 5. RAID controller 102 of FIG. 1 maintains within its non-volatile memory information regarding which physical positions were previously known to contain disk drives. To speed the activation of groups defined within the RAID subsystem involving these previously installed disk drives, element 400 first activates groups defined by the configuration information stored on those previously known disk drives.

Element 402 is next operable to detect all drives physically present in any positions of the RAID subsystem. Regardless of information stored in the RAID controller's non-volatile memory, element 402 locates all drives actually present within the RAID subsystem. The presence of new drives added to the subsystem, as well as the absence of drives removed from the subsystem, will be detected by operation of this element 402. Element 404 is next operable to process the information detected by operation of element 402 by activating those groups which are so identified and which have not yet been activated by operation of element 400. Any changes to the group configuration implied by movement, removal, or addition of disk drives within the RAID subsystem is automatically detected by this operation of element 404 to activate all remaining groups. This permits the RAID controller, using the methods and structure of the present invention, to rapidly and flexibly detect changes in the configuration of the RAID subsystem and adjust the RAID controller to process host computer requests in accordance with the updated configuration. Previous designs would require manual (operator) intervention to adjust the configuration of the RAID subsystem groups before permitting host computer I/O request to be processed. One of ordinary skill in the arts will readily recognize several variations and optimization to the method presented above. For example, the method may be simplified to eliminate the processing of step 400 and allow all drives and associated groupings to be detected by the processing of elements 402 and 404 above. The performance enhancement realized by adding the step of element 400 may be less important in certain applications thereby permitting this simplification to the methods of the present invention. Conversely, other performance improvements may be realized by adding additional steps to detect other common configuration changes before the more general detection and processing of elements 402 and 404. These further performance gains may be of benefit in certain RAID applications where particular types of re-configurations are common. All such variations and performance improvements to the above discussed methods are within the spirit and scope of the claimed invention.

Any drives which are members of identified groups and are either not present or present but apparently inoperable are marked, by operation of element 406, as "MISSING" within the memory of the RAID controller. Drives which are so marked as "MISSING" are also referred to herein as inaccessible. These groups are not presently operable due to the missing (or malfunctioning) drive(s), but they may be activated by the RAID reset operation. So long as no I/O requests are directed to these inoperable groups, no error condition need be reported. Elements 400–404, in combination, serve to activate all groups of disk drives within the RAID subsystem for which all member drives of the group are detected and operable. Groups which include member drives which are either not present or detected as present but inoperable are activated by operation of element 408. Other methods of the present invention discussed below with respect to FIGS. 6 and 7 manage the status of these non-operational groups.

Element 410 is finally operable to update (rewrite, or refresh) the non-volatile memory within the RAID controller 102 and any affected disk drives to reflect the physical positions of all detected disk drives within the RAID subsystem. This update permits the next RAID reset operation to rapidly activate newly defined group configurations according to the information updated in the RAID controllers non-volatile memory (e.g. to benefit from the performance gains realized by element 400 processing). Finally, with all operational, configured groups so activated by operation of elements 400 and 404, and non-operational groups activated by element 408, the RAID controller continues by processing host requests in the normal operating mode.

IDENTIFYING CONFIGURED GROUPS

Figure 5:
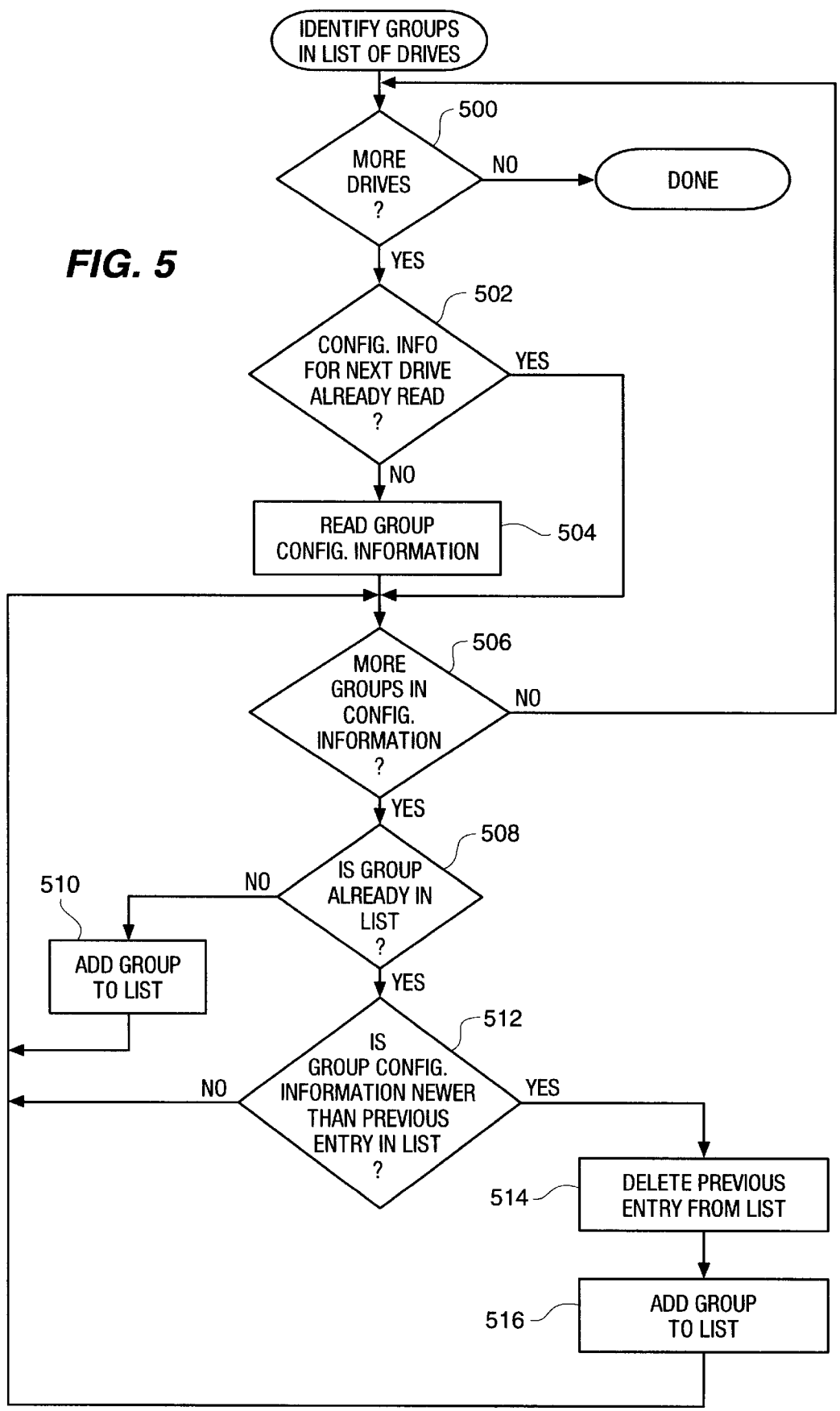
FIG. 5 is a flowchart describing additional details of the steps required in the method of FIG. 4 to identify groups to be activated in the RAID storage subsystem.

FIG. 5 is a flowchart describing additional details of the operation of elements 400, 404, and 408 of FIG. 4 to identify configured groups within the RAID subsystem. Specifically, the method of FIG. 5 describes the details of identifying all groups potentially configured within the disk array of the RAID subsystem. Element 500 first determines whether all disk drives within the disk array of the RAID subsystem have been processed by the method of FIG. 5. Specifically, element 500 terminates further operation of the method when no further disk drives remain to be processed. If further disk drives remain to be processed by the method of FIG. 5, elements 502–516 are repetitively operable to process the each disk drive in the RAID subsystem. Element 502 is operable to determine whether the group configuration information recorded on the drive (e.g. DAG1 232 or DAG2 234, etc. of FIG. 2) has already been read into the controller by an earlier operation of element 504. If the group configuration information on the drive has not been read, element 504 is next operable to read the group configuration information from the disk drive into the RAID controller memory. If element 502 determines that the configuration information for the drive has already been read, element 504 is skipped and processing continues at element 506. Element 506 is operable to determine whether more groups remain in the configuration information read from the disk drive to be processed by the method of FIG. 5. If element 506 determines that more groups remain to be processed in the configuration information read from the current drive, elements 508–516 are repetitively operable to process each group with configuration information stored on the current disk drive. If element 506 determines that no further groups remain in the configuration information read from the current drive, processing continues by looping back to element 500 to process additional disk drives, if any.

Elements 508–516 are operable to process each of the group configuration information sections written to the current disk drive. As noted above, the configuration information sections, DAG1 232, DAG2 234, etc. of FIG. 2, are written in the reserved area 122 of each disk drive. Zero or more group configuration information sections may be written in the reserved area 122 of each disk drive 110. One group configuration information section is written on disk for each group in which the corresponding disk drive is a member. Element 508 is first operable to determine whether the group configuration information section being processed has already been added to the list of processed group configuration information sections. The group configuration information section (e.g. DAG1 232 or DAG2 234 of FIG. 2) identifies the group using the time stamp element (e.g. DAG1.TIMESTAMP 208) described above with respect to FIG. 2 and the configuration information element (e.g. DAG1.CONFIG 210). If the group configuration information section has not already been added to the list by prior operation of element 510 or element 516, then element 510 is next operable to add the information to the list of groups to be processed. Processing then continues by looping back to element 506 to determine whether more groups remain to be processed. If the group configuration information section of the current disk drive describes a group which has already been added to the list of groups to be processed, element 512 is next operable to determine whether the group configuration information section currently being processed is newer than the previous entry in the list. Element 512 makes this determination by comparing time stamp and other configuration information stored in the configuration information section being processed. If the current group configuration information section is older than the information previously processed and entered in the list, processing continues by looping back to element 506 to process further groups of the current disk drive. Otherwise, if the current group configuration information section is newer than the previous entry in the list, elements 514 and 516 are next operable to delete the previous entry from the list and add the new group configuration information section to the list of processed groups. Processing then continues by looping back to element 506 to determine whether additional groups remain to be processed in which the current disk drive is a member. As noted above, when element 506 determines that all groups in which the current disk drive is a member have been processed, processing continues by looping back to element 500 to continue processing additional disk drives detected in the RAID subsystem.

MANAGING NON-OPERATIONAL GROUPS

Figure 6:
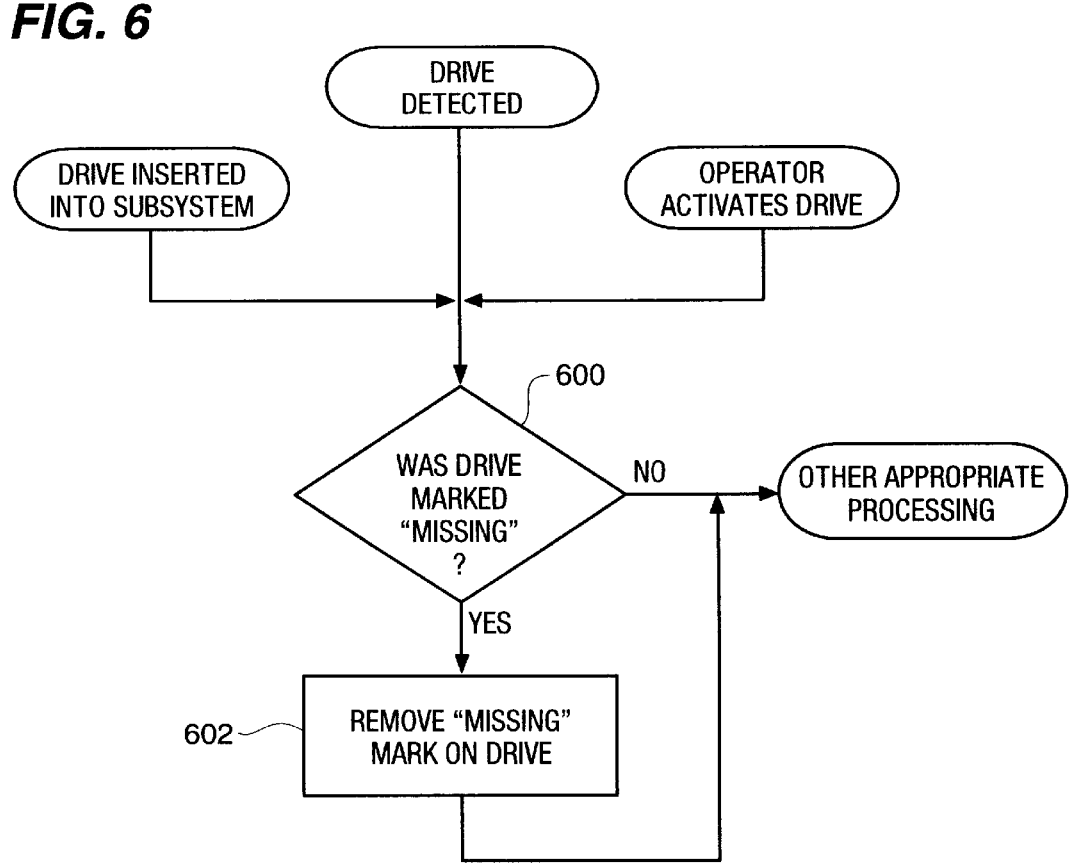
FIG. 6 is a flowchart describing the operation of the RAID controller in response to the detection of a previously missing drive.

As noted above with respect to FIG. 4, non-operational groups activated by operation of element 408 have one or more drives marked as "MISSING." FIG. 6 is a flowchart describing the methods of the present invention which manage the state of non-operational groups in response to a "MISSING" drive being detected. The method of FIG. 6 is invoked by any operation which adds a drive to the RAID subsystem, including: physical insertion of a drive into the RAID subsystem, physical change of an inserted drive such that it becomes detectable (e.g. delayed spin-up of the disk drive), or an operator configuration operation which makes a previously ignored drive available for use in a disk array group.

Element 600 of the method in FIG. 6 is first operable to determine that the newly discovered drive was previously marked as "MISSING." If so, the "MISSING" status is removed by operation of element 602 (i.e. changed to operational status or other indicia of readiness). In either case, other appropriate processing (if any) then continues in response to the discovery of the new drive.

When all "MISSING" disk drives associated with a group are eventually detected, the group may be said to be enabled for processing of I/O requests from the host computer. The group is enabled by virtue of no disk drive associated with the group having a "MISSING" status. In a physical sense, the group is enabled by operation of step 408, discussed above with respect to FIG. 4, which "activates" groups having at least one "MISSING" disk drive. Such groups are enabled in that it does not report an erroneous status to a host computer so long as no I/O request is directed to the group.

Figure 7:
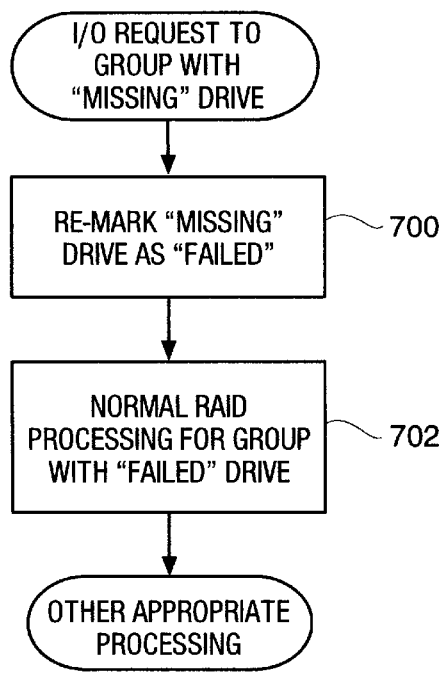
FIG. 7 is a flowchart describing the operation of the RAID controller in response to a host initiated I/O request to a group having a missing drive member.

As noted above, the non-operational groups are activated but cannot actually process host computer requests due to the missing or inoperative drive(s) in the group. FIG. 7 is a flowchart describing the method of the present invention which respond to an I/O request directed to a non-operational activated group (i.e. a group with a "MISSING"

drive). Element 700 is first operable to change the state of the "MISSING" drive to that of a "FAILED" drive. Element 702 is then operable to perform RAID subsystem processing in response to an I/O request directed to a group with a drive failure. These RAID error processing methods are well known to those of ordinary skill in the arts and need not be discussed further. Other appropriate processing (if any) in response to the I/O request then continues.

As noted above, groups having at least one "MISSING" disk drive are enabled until an I/O request is directed to it from a host computer. The group then becomes disabled in that an error condition is reported to the host computer through normal RAID processing techniques. Normal RAID processing techniques, well known to those of ordinary skill in the art may then be invoked to recover and re-enable the disabled group.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a RAID storage subsystem having a plurality of disk drives configured into a plurality of groups and a controller, a method operable in said controller for detecting configuration changes in said subsystem comprising the steps of:

storing configuration information on each of said disk drives wherein said configuration information includes group configuration information corresponding to each group of said plurality of groups with which the corresponding disk drive is associated;

reading said configuration information from said disk drives; and reconfiguring said plurality of groups of said subsystem in accordance with configuration information read from said disk drives independent of the physical location of said disk drives within said RAID subsystem.

2. The method of claim 1 wherein said configuration information includes a unique identifier to identify each of said disk drives from all other disk drives in said subsystem.

3. The method of claim 2 wherein the step of reconfiguring includes the steps of:

identifying all disk drives which are members of each group;

determining the operability of each of said identified drives; and activating each of said groups for which all of said disk drives associated with said each of said groups are determined to be operable, wherein said activating step includes commencement of processing of I/O requests from an attached host computer system.

4. The method of claim 2 further comprising the step of activating at least one of said plurality of groups to process host computer I/O requests.

5. The method of claim 4 wherein said controller is associated with a non-volatile memory containing information identifying physical locations in said RAID subsystem which contained a disk drive and wherein the step of activating includes the step of:

activating all of said plurality of groups for which all of said disk drives associated therewith are operational and all of said disk drives associated therewith are in physical locations identified by said information in said associated memory.

6. The method of claim 4 wherein said controller is associated with a non-volatile memory containing information identifying physical locations in said RAID subsystem which contained a disk drive and wherein the step of activating includes the step of:

activating all of said plurality of groups for which all of said disk drives associated therewith are operational and some of said disk drives associated therewith are in physical locations other than those identified by said information in said associated memory.

7. The method of claim 4 wherein the step of activating includes the step of:

activating all of said plurality of groups for which at least one of said disk drives associated therewith is inaccessible.

8. The method of claim 7 further comprising the step of:

enabling a group, having at least one inaccessible disk drive, for processing of I/O requests in response to detection of all inaccessible disk drives associated with said group.

9. The method of claim 7 further comprising the step of:

disabling a group, having at least one inaccessible disk drive, from processing of I/O requests in response to receipt of an I/O request.

10. In a RAID storage subsystem having a plurality of disk drives configured into a plurality of groups and a controller, an apparatus for detecting configuration changes in said subsystem comprising:

means for storing configuration information on each of said disk drives wherein said configuration information includes group configuration information corresponding to each group of said plurality of groups with which the corresponding disk drive is associated;

means for reading said configuration information from said disk drives; and means for reconfiguring said plurality of groups of said subsystem in accordance with configuration information read from said disk drives independent of the physical location of said disk drives within said RAID subsystem.

11. The apparatus of claim 10 wherein said configuration information includes a unique identifier to identify each of said disk drives from all other disk drives in said subsystem.

12. The apparatus of claim 11 wherein the means for reconfiguring includes:

means for identifying all disk drives which are members of each group;

means for determining the operability of each of said identified drives; and means for activating each of said groups for which all of said disk drives associated with said each of said groups are determined to be operable, wherein said means for activating includes commencement of processing of I/O requests from an attached host computer system.

13. The apparatus of claim 11 further comprising means for activating at least one of said plurality of groups to process host computer I/O requests.

14. The apparatus of claim 13 wherein said controller is associated with a non-volatile memory containing information identifying physical locations in said RAID subsystem which contained a disk drive and wherein the means for activating includes:

means for activating all of said plurality of groups for which all of said disk drives associated therewith are operational and all of said disk drives associated therewith are in physical locations identified by said information in said associated memory.

15. The apparatus of claim 13 wherein said controller is associated with a non-volatile memory containing information identifying physical locations in said RAID subsystem which contained a disk drive and wherein the means for activating includes:

means for activating all of said plurality of groups for which all of said disk drives associated therewith are operational and some of said disk drives associated therewith are in physical locations other than those identified by said information in said associated memory.

16. The apparatus of claim 13 wherein the means for activating includes:

means for activating all of said plurality of groups for which at least one of said disk drives associated therewith is inaccessible.

17. The apparatus of claim 16 further comprising:

means for enabling a group, having at least one inaccessible disk drive, for processing of I/O requests in response to detection of all inaccessible disk drives associated with said group.

18. The apparatus of claim 16 further comprising:

means for disabling a group, having at least one inaccessible disk drive, from processing of I/O requests in response to receipt of an I/O request.

\* \* \* \* \*